(12) United States Patent
Yan et al.

(10) Patent No.: US 11,985,497 B2
(45) Date of Patent: May 14, 2024

(54) SYSTEMS AND METHODS FOR NETWORK-BASED ENCRYPTION OF A USER EQUIPMENT IDENTIFIER

(71) Applicant: Verizon Patent and Licensing Inc., Basking Ridge, NJ (US)

(72) Inventors: Lixia Yan, Basking Ridge, NJ (US); Barry F. Hoffner, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 251 days.

(21) Appl. No.: 17/656,145

(22) Filed: Mar. 23, 2022

(65) Prior Publication Data

US 2023/0308866 A1    Sep. 28, 2023

(51) Int. Cl.
*H04W 12/02*        (2009.01)
(52) U.S. Cl.
CPC ................................... *H04W 12/02* (2013.01)
(58) Field of Classification Search
CPC .................................................... H04W 12/02
USPC .............................................................. 726/26
See application file for complete search history.

(56) References Cited

U.S. PATENT DOCUMENTS

| | | | |
|---|---|---|---|
| 2021/0185523 A1* | 6/2021 | Targali | H04W 12/0471 |
| 2021/0258316 A1* | 8/2021 | Liu | H04L 63/0876 |
| 2022/0240213 A1* | 7/2022 | Ly | H04W 60/04 |

* cited by examiner

Primary Examiner — Tu T Nguyen

(57) ABSTRACT

A network device may receive a request for authentication data, for a UE attempting to register with a network, and an indication that a SUCI utilized by the UE is unencrypted, and may request, from a data store, the authentication data for the UE. The network device may provide, to the data store, a notification instructing the data store to push a UE parameters update (UPU) once a registration process is complete for the UE, and may receive the authentication data from the data store. The network device may complete the registration process for the UE based on the authentication data, and may receive the UPU from the data store based on the registration process being completed. The network device may cause the UE to detach from the network after utilizing the UPU, and may cause the UE to reconnect to the network with an encrypted SUCI.

20 Claims, 9 Drawing Sheets

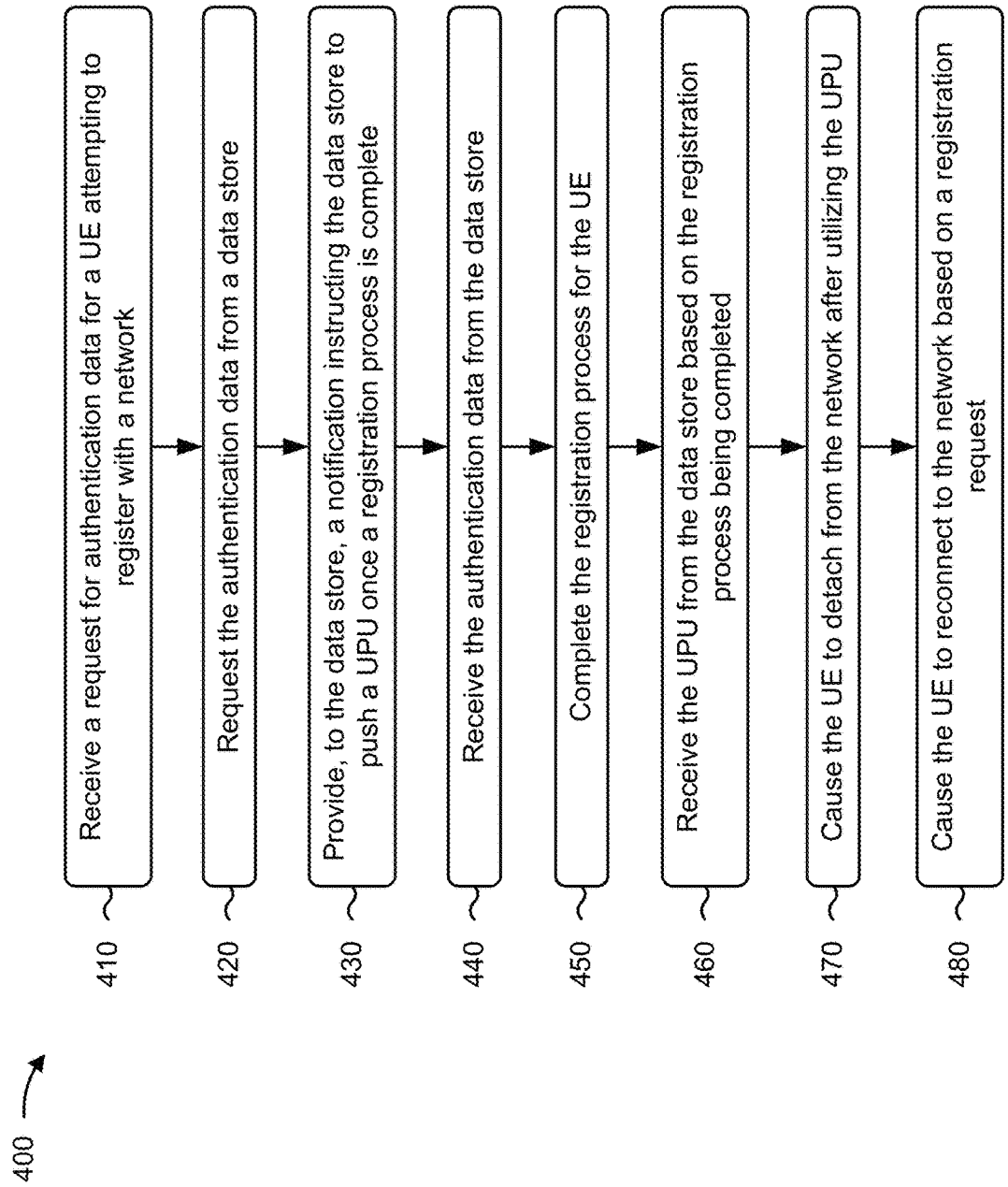

SYSTEMS AND METHODS FOR NETWORK-BASED ENCRYPTION OF A USER EQUIPMENT IDENTIFIER

BACKGROUND

A user equipment (UE) may attach to a fourth-generation (4G) network by using an international mobile subscriber identity (IMSI) in plain text format during a first time registration with the 4G network. This enables the 4G network to understand a context of the UE.

BRIEF DESCRIPTION OF THE DRAWINGS

FIG. 4 is a flowchart of an example process for network-based encryption of a UE identifier.

DETAILED DESCRIPTION OF EXAMPLE EMBODIMENTS

Figure 1A:
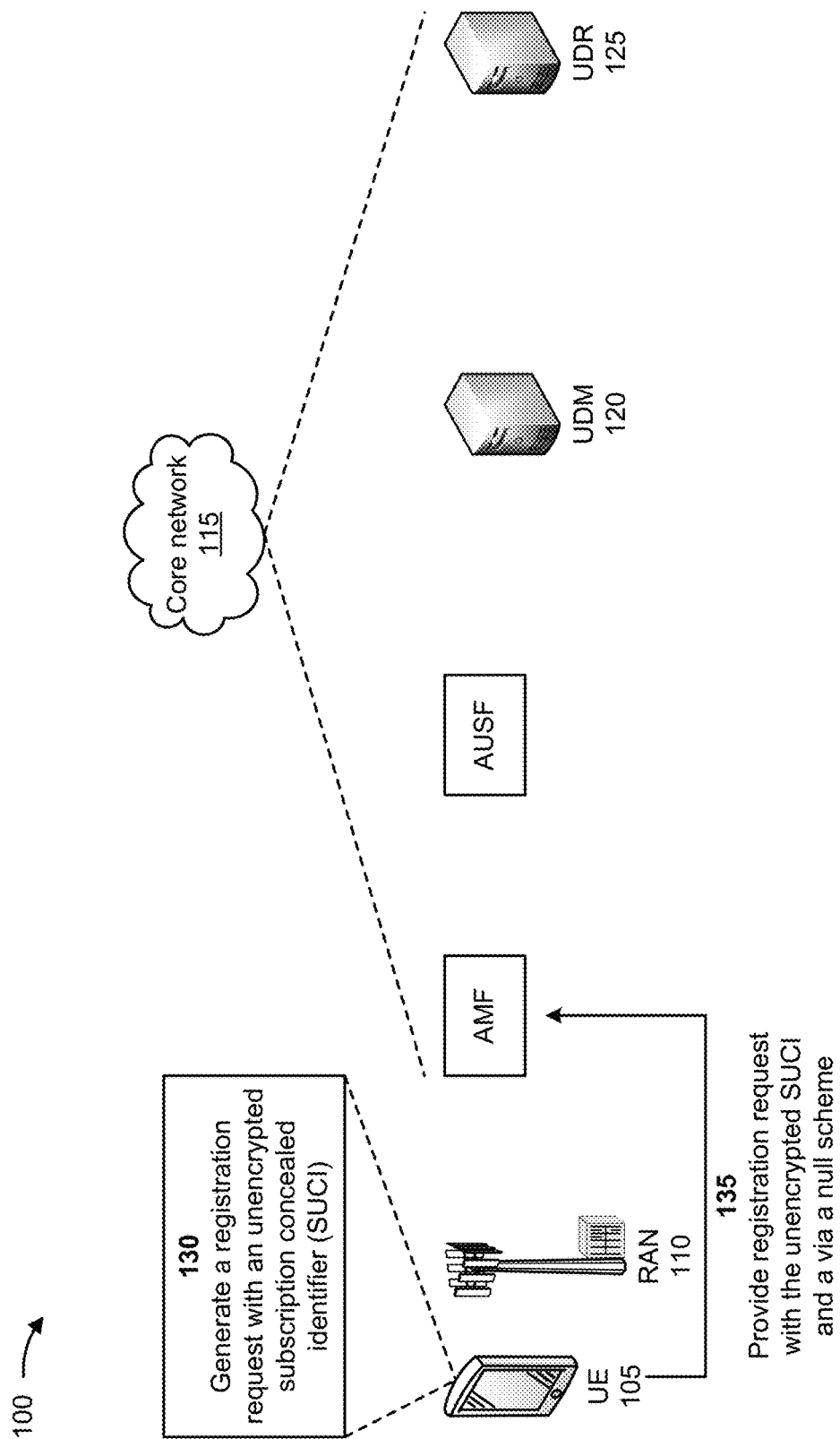
FIGS. 1A-1F are diagrams of an example associated with network-based encryption of a UE identifier.

The following detailed description of example implementations refers to the accompanying drawings. The same reference numbers in different drawings may identify the same or similar elements.

A UE attaching to a 4G network, via an IMSI without protection, may cause a potential security issue for the UE. For example, the UE may attach to the 4G network via a message that shows that IMSI in clear text. If IMSI values are sent in plaintext over a radio access link, the user of the UE can be identified, located, and tracked using these values. For example, the unprotected IMSI can be used by bad actors to track an identity of a user of the UE, intercept calls and messages generated by the UE, and hijack mobile data of the UE. The 3GPP standard for fifth-generation (5G) networks attempts to correct this issue by encrypting a permanent identifier (e.g., a subscription permanent identifier or SUPI) of the UE as a subscription concealed identifier (SUCI) and transmitting the SUCI. Since the encrypted SUCI is re-generated with an ephemeral key for each use, bad actors can no longer derive the user's identity. The UE may register with a 5G network via the encrypted SUCI. SUCI is calculated based on home network public key, protection scheme identifier, and home network public key identifier parameters included in a universal subscriber identity module (USIM) of the UE during manufacture of the UE. However, there are some cases where the home network public key, the protection scheme identifier, and the home network public key identifier parameters are not included in the USIM of a UE, and a user of such as UE may still be subject to a potential security issue. For example, when a transitional 5G SIM is utilized for a UE, the home network public key, the protection scheme identifier, and the home network public key identifier parameters are not included in the 5G SIM of the UE. The UE may attach to the 5G network by using an unencrypted SUCI via a null scheme (e.g., an insecure scheme that provides no privacy protection for the user). If IMSI or SUPI values are sent in plaintext (e.g., via the unencrypted SUCI) over a radio access link, the user of the UE can be identified, located, and tracked using these values, and bad actors may intercept calls and/or messages of the UE, and hijack mobile data of the UE.

Thus, current mechanisms for protecting a UE from potential security issues during network attach consume computing resources (e.g., processing resources, memory resources, communication resources, and/or the like), networking resources, and/or other resources associated with handling identification and tracking a user of the UE by bad actors, handling interception of calls and/or messages of the UE by bad actors, handling hijacking of mobile data of the UE by bad actors, and/or the like.

Some implementations described herein provide a network device (e.g., a unified data management (UDM) device) that provides network-based encryption of a UE identifier. For example, the UDM device may receive a request for authentication data, for a UE attempting to register with a network, and an indication that a SUCI utilized by the UE is unencrypted, and may request, from a data store, the authentication data for the UE based on the request for the authentication data. The UDM device may provide, to the data store and based on the indication, a notification instructing the data store to push a UE parameters update (UPU) once a registration process is complete for the UE, and the UDM device may receive the authentication data from the data store based on requesting the authentication data from the data store. The UDM device may complete the registration process for the UE based on the authentication data, and may receive, based on the notification, the UPU from the data store based on the registration process being completed. The UDM device may cause the UE to detach from the network after utilizing the UPU, and the UDM device may cause the UE to connect to the network based on a registration request generated by the UE and including an encrypted SUCI.

In this way, the UDM device provides network-based encryption of a UE identifier. For example, the UDM device may automatically provision the home network public key, protection scheme identifier, and home network public key identifier parameters into a USIM of a UE during a first registration request (e.g., when the UDM device detects that the UE is registering with the 5G network via a null scheme and an unencrypted SUCI). The UDM device may prevent a bad actor from deriving an identity of a user of the UE and may improve user security. The UE may utilize an encrypted SUCI to register with the 5G network in the future, instead of using the unencrypted SUCI via the null scheme. The UDM device may store the home network public key, the protection scheme identifier, and the home network public key identifier parameters in a unified data repository (UDR). When the UDM device determines that the UE is attaching to the 5G network with an unencrypted SUCI and via the null scheme, the UDM device may trigger UE parameter update (UPU) procedure to provision the home network public key, the protection scheme identifier, and the home network public key identifier parameters in the USIM of the UE. Thus, the UDM device may conserve computing resources, networking resources, and/or other resources associated with handling identification and tracking a user of the UE by bad actors, handling interception of calls and/or messages of the UE by bad actors, handling hijacking of mobile data of the UE by bad actors, and/or the like.

FIGS. 1A-1F are diagrams of an example 100 associated with network-based encryption of a UE identifier. As shown in FIGS. 1A-1F, example 100 includes a UE 105, a RAN 110, and a core network 115. The core network 115 may include a UDM device 120, a UDR 125, an access and mobility management function (AMF), and/or an authentication server function (AUSF). Further details of the UE 105, the RAN 110, the core network 115, the UDM device 120, the UDR 125, the AMF, and the AUSF are provided elsewhere herein. Although only a single UE 105 and RAN 110 are depicted in FIG. 1A, in some implementations multiple UEs 105 and RANs 110 may be associated with the core network 115.

As shown in FIG. 1A, and by reference number 130, the UE 105 may generate a registration request with an unencrypted SUCI. For example, a user of the UE 105 may wish to connect to the core network 115, and a user may cause the UE 105 to generate the registration request in order to connect to the core network 115. A USIM of the UE 105 may not include home network public key, protection scheme identifier, and home network public key identifier parameters for the UE 105 due to an improper configuration. The UE 105 may not then be able to encrypt the SUCI since the USIM fails to include the home network public key, protection scheme identifier, and home network public key identifier parameters. Thus, the registration request may include an unencrypted SUCI. The unencrypted SUCI may include the IMSI or the SUPI associated with the UE 105.

As further shown in FIG. 1A, and by reference number 135, the UE 105 may provide the registration request with the unencrypted SUCI, and via a null scheme, to the AMF. For example, the UE 105 may utilize the null scheme (e.g., an insecure scheme that provides no privacy protection for the user of the UE 105) and the RAN 110 to provide the registration request with the unencrypted SUCI to the AMF. The AMF may receive the registration request from the UE 105, and may generate a request for authentication data, associated with the UE 105, based on receiving the registration request.

Figure 1B:
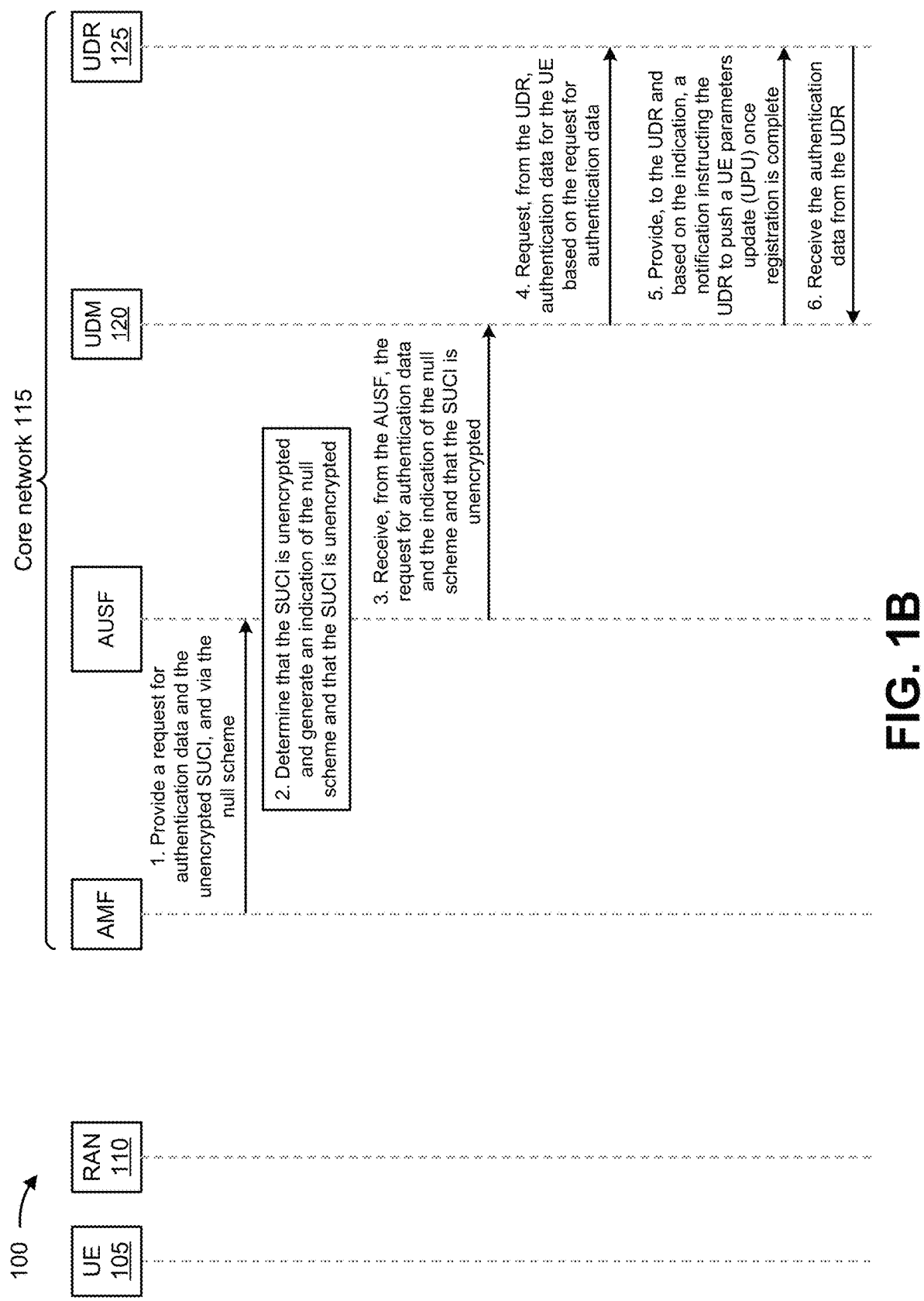
Figure 1C:
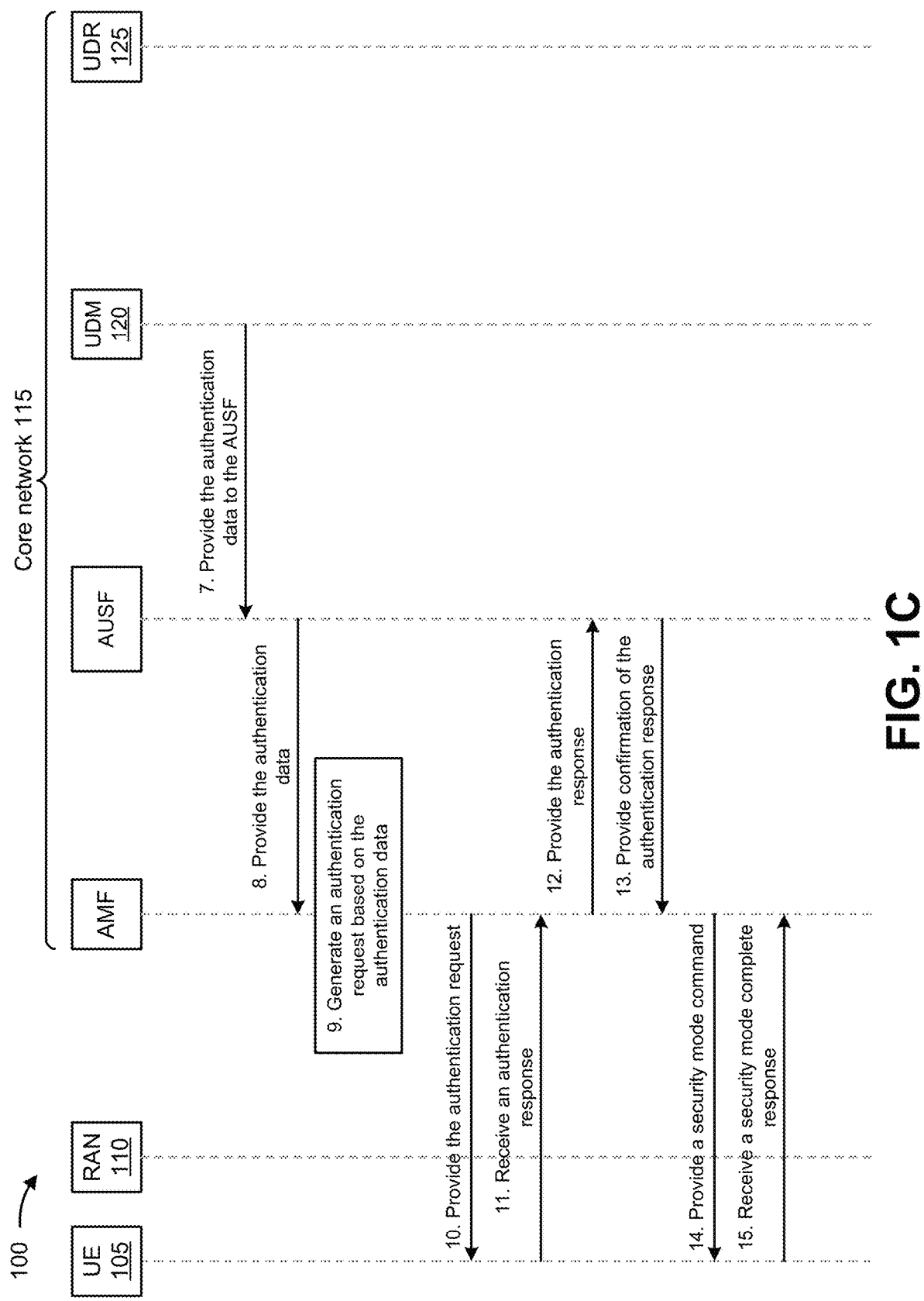
Figure 1D:
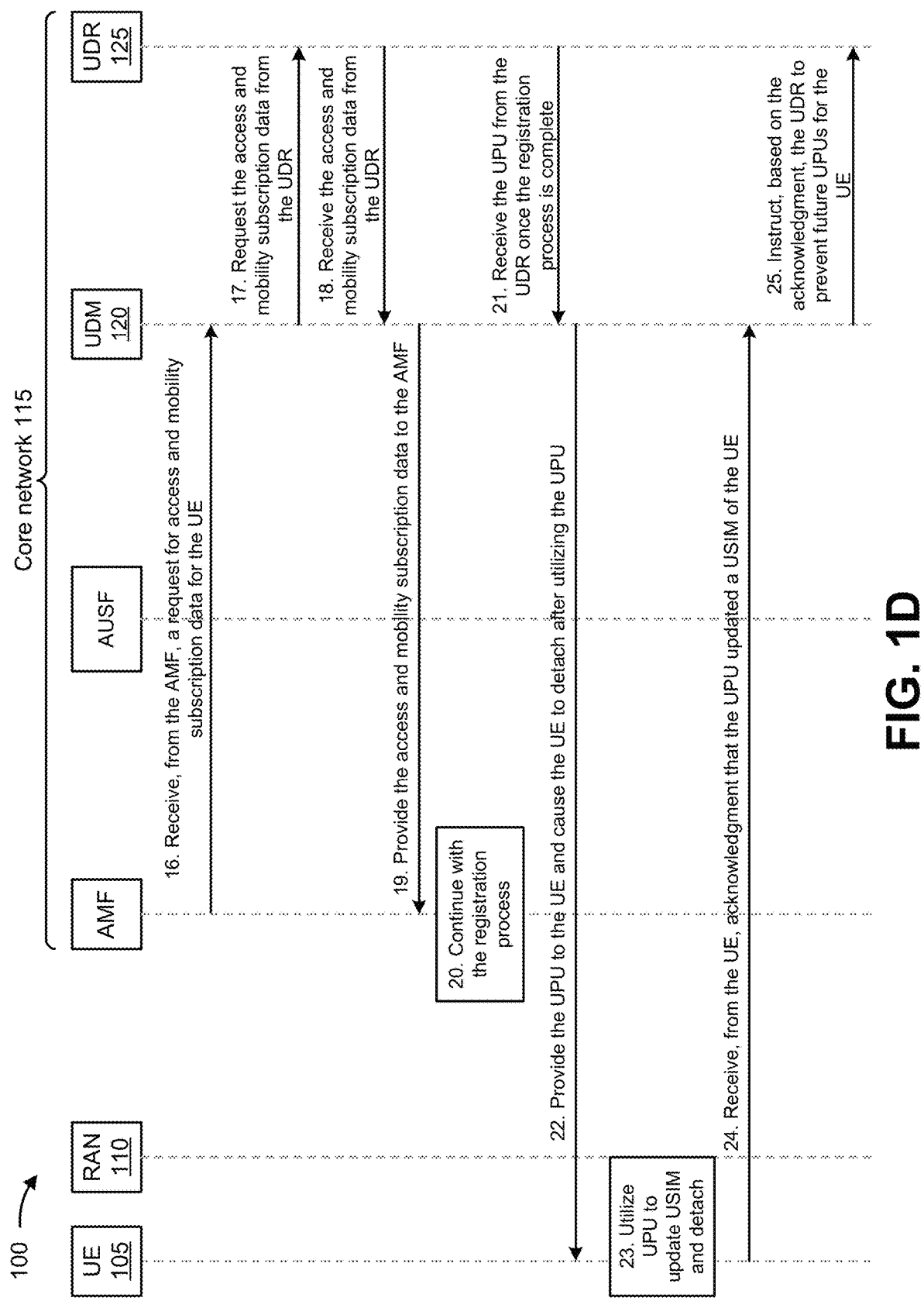

FIGS. 1B-1D are call flow diagrams associated with network-based encryption of a UE identifier. As shown at step 1 of FIG. 1B, the AMF may provide the request for the authentication data associated with the UE 105 and the unencrypted SUCI to the AUSF, via the null scheme. As shown at step 2 of FIG. 1B, the AUSF may determine that the SUCI is unencrypted and may generate an indication of the usage and/or detection of the null scheme and that the SUCI is unencrypted. For example, the AUSF may identify the IMSI of the UE 105 from the SUCI and may determine that the SUCI is unencrypted based on identifying the IMSI of the UE 105. The AUSF may generate the indication of the null scheme and that the SUCI is unencrypted based on determining that the SUCI is unencrypted. The AUSF may provide the request for the authentication data and the indication of the null scheme and that the SUCI is unencrypted to the UDM device 120. As shown at step 3 of FIG. 1B, the UDM device 120 may receive, from the AUSF, the request for the authentication data and the indication of the null scheme and that the SUCI is unencrypted.

As shown at step 4 of FIG. 1B, the UDM device 120 may request, from the UDR 125, the authentication data for the UE 105 based on receiving the request for the authentication data. For example, the UDM device 120 may provide the request for the authentication data to the UDR 125 in order to request the authentication data from the UDR 125. Based on the indication of the null scheme and that the SUCI is unencrypted, the UDM device 120 may generate a notification instructing the UDR 125 to push a UPU once the registration is complete for the UE 105. The UPU may include a home network identifier for the UE 105, a protection scheme for the UE 105, a home network public key identifier for the UE 105, and/or the like, and the UDR 125 may store the information associated with the UPU. The home network identifier may identify a home network for the UE 105, the protection scheme may identify a null scheme or a profile scheme for the UE 105, the home network public key identifier identifies a public key to be used to encrypt the SUCI, and/or the like.

As shown at step 5 of FIG. 1B, the UDM device 120 may provide, to the UDR 125 and based on the indication, the notification instructing the UDR 125 to push the UPU once registration is complete for the UE 105. As shown at step 6 of FIG. 1B, the UDM device 120 may receive the authentication data from the UDR 125. For example, the UDR 125 may retrieve the authentication data for the UE 105 based on the request for the authentication data received from the UDM device 120. The UDR 125 may provide the authentication data to the UDM device 120, and the UDM device 120 may receive the authentication data.

As shown at step 7 of FIG. 1C, the UDM device 120 may provide the authentication data to the AUSF based on the request for the authentication data received from the AUSF. As shown at step 8 of FIG. 1C, the AUSF may provide the authentication data to the AMF based on the request for the authentication data received from the AMF. As shown at step 9 of FIG. 1C, the AMF may generate an authentication request based on the authentication data. For example, the authentication request may include a request for the UE 105 to validate the authentication data for the UE 105 so that the UE 105 may complete registration for access to the core network 115. As shown at step 10 of FIG. 1C, the AMF may provide the authentication request to the UE 105. The UE 105 may receive the authentication request and may generate an authentication response to the authentication request. The authentication response may validate the authentication data for the UE 105. The UE 105 may provide the authentication response to the AMF. As shown at step 11 of FIG. 1C, the AMF may receive the authentication response from the UE 105.

As shown at step 12 of FIG. 1C, the AMF may provide the authentication response to the AUSF. The AUSF may receive the authentication response and may confirm the authentication response by generating a confirmation of the authentication response. As shown at step 13 of FIG. 1C, the AUSF may provide the confirmation of the authentication response to the AMF. After receiving the confirmation of the authentication response, the AMF may generate a security mode command that includes a non-access stratum (NAS) security algorithm and a key set identifier (KSI). The security parameters for authentication, integrity protection and ciphering are tied together in a 5G NAS security context and identified by the KSI. The 5G NAS security context may be created as a result of a primary authentication and key agreement procedure between the AMF and the UE 105. As shown at step 14 of FIG. 1C, the AMF may provide the security mode command to the UE 105. The UE 105 may complete the key agreement procedure based on the security mode command and may generate a security mode complete response. The UE 105 may provide the security mode complete response to the AMF. As shown at step 15 of FIG. 1C, the AMF may receive the security mode complete response from the UE 105.

As shown at step 16 of FIG. 1D, the UDM device 120 may receive, from the AMF, a request for access and mobility subscription data for the UE 105. For example, the AMF may generate the request for the access and mobility subscription data based on receiving the security mode complete response from the UE 105 and may provide the request for the access and mobility subscription data to the UDM device 120. The access and mobility subscription data may include data identifying access and mobility parameters associated with a subscription of the UE 105. As shown at step 17 of FIG. 1D, the UDM device 120 may request the access and mobility subscription data, from the UDR 125, based on receiving the request for the access and mobility subscription data. As shown at step 18 of FIG. 1D, the UDM device 120 may receive the access and mobility subscription data from the UDR 125. For example, the UDR 125 may retrieve the access and mobility subscription data based on the request received from the UDM device 120 and may provide the access and mobility subscription data to the UDM device 120. As shown at step 19 of FIG. 1D, the UDM device 120 may provide the access and mobility subscription data to the AMF.

As shown at step 20 of FIG. 1D, the AMF may continue with the registration process for registering the UE 105. For example, the AMF and AUSF may continue with the registration process to authenticate the UE 105 and the network (e.g., the RAN 110 and/or the core network 115) to be utilized by the UE 105. In one example, the AMF may provide a request to the UDM device for session management function (SMF) selection information for the UE 105 using an SMF selection subscription data retrieval procedure. Once the registration process is complete for the UE 105, the UDR 125 may be notified that the registration process for the UE 105 is complete and may provide the UPU to the UDM device 120 based on the registration process being complete for the UE 105. As shown at step 21 of FIG. 1D, the UDM device 120 may receive the UPU from the UDR 125 once the registration process is complete for the UE 105.

As shown at step 22 of FIG. 1D, the UDM device 120 may provide the UPU to the UE 105 and may cause the UE 105 to detach after utilizing the UPU. For example, the UPU may include an instruction that instructs the UE 105 to detach (e.g., from the RAN 110 and the core network 115) after utilizing the UPU. As shown at step 23 of FIG. 1D, the UE 105 may utilize the UPU to update a USIM of the UE 105 and may detach. For example, the UE 105 may execute the UPU and execution of the UPU may cause the UE 105 to store the home network identifier for the UE 105, the protection scheme for the UE 105, the home network public key identifier for the UE 105, and/or the like in the USIM of the UE 105. Before detaching from the network, the UE 105 may provide, to the UDM device 120, an acknowledgement that the UPU updated the USIM of the UE 105. The UE 105 may then detach from the network. As shown at step 24 of FIG. 1D, the UDM device 120 may receive, from the UE 105, that acknowledgment that the UPU updated the USIM of the UE 105. As shown at step 25 of FIG. 1D, the UDM device 120 may instruct, based on the acknowledgement, the UDR 125 to prevent future UPUs for the UE 105.

Figure 1E:
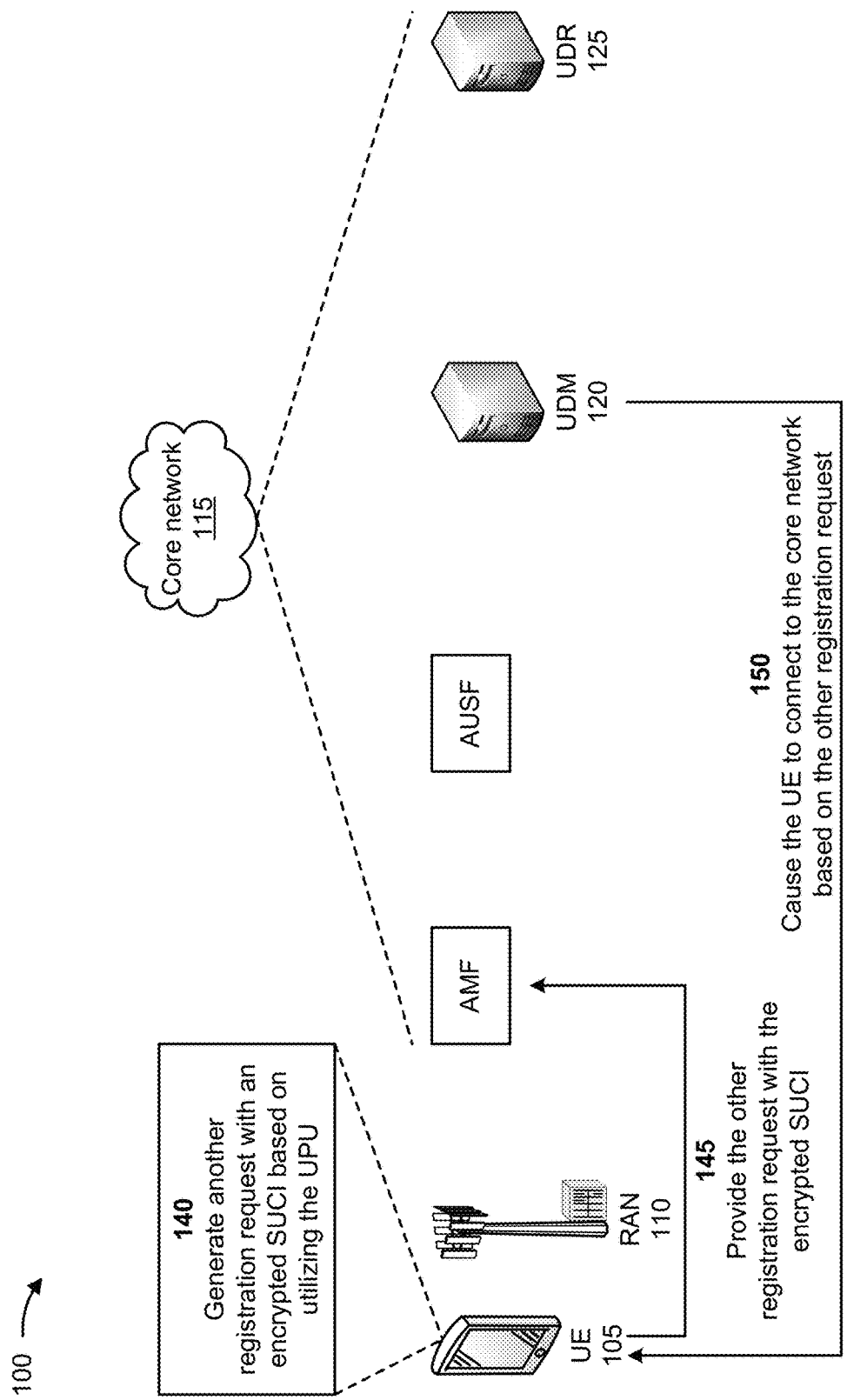

As shown in FIG. 1E, and by reference number 140, the UE 105 may generate another registration request with an encrypted SUCI based on utilizing the UPU. For example, after detaching from the network, the UE 105 may reconnect with the network by generating the other registration request. The UE 105 may generate the encrypted SUCI by encrypting the SUPI of the UE 105 based on the security parameters (e.g., the home network identifier for the UE 105, the protection scheme for the UE 105, the home network public key identifier for the UE 105, and/or the like) stored in the USIM. The UE 105 may include the encrypted SUCI with the other registration request.

As further shown in FIG. 1E, and by reference number 145, the UE 105 may provide the other registration request with the encrypted SUCI to the AMF. For example, the UE 105 may utilize the RAN 110 to provide the other registration request with the encrypted SUCI to the AMF. The AMF may receive the registration request from the UE 105 and may initiate the registration process for the UE 105.

As further shown in FIG. 1E, and by reference number 150, the UDM device 120 may cause the UE 105 to connect to the core network 115 based on the other registration request. For example, the UDM device 120 and other network elements (e.g., the AMF, the AUSF, the UDR 125, and/or the like) may utilize the other registration request to complete the registration process for the UE 105 so that the UE 105 is able to connect to the core network 115. Since the other registration request includes the encrypted SUCI, the UE 105 may securely complete the registration process without bad actors being able to track an identity of the user of the UE 105, intercept calls and messages generated by the UE 105, and hijack mobile data of the UE 105.

Figure 1F:
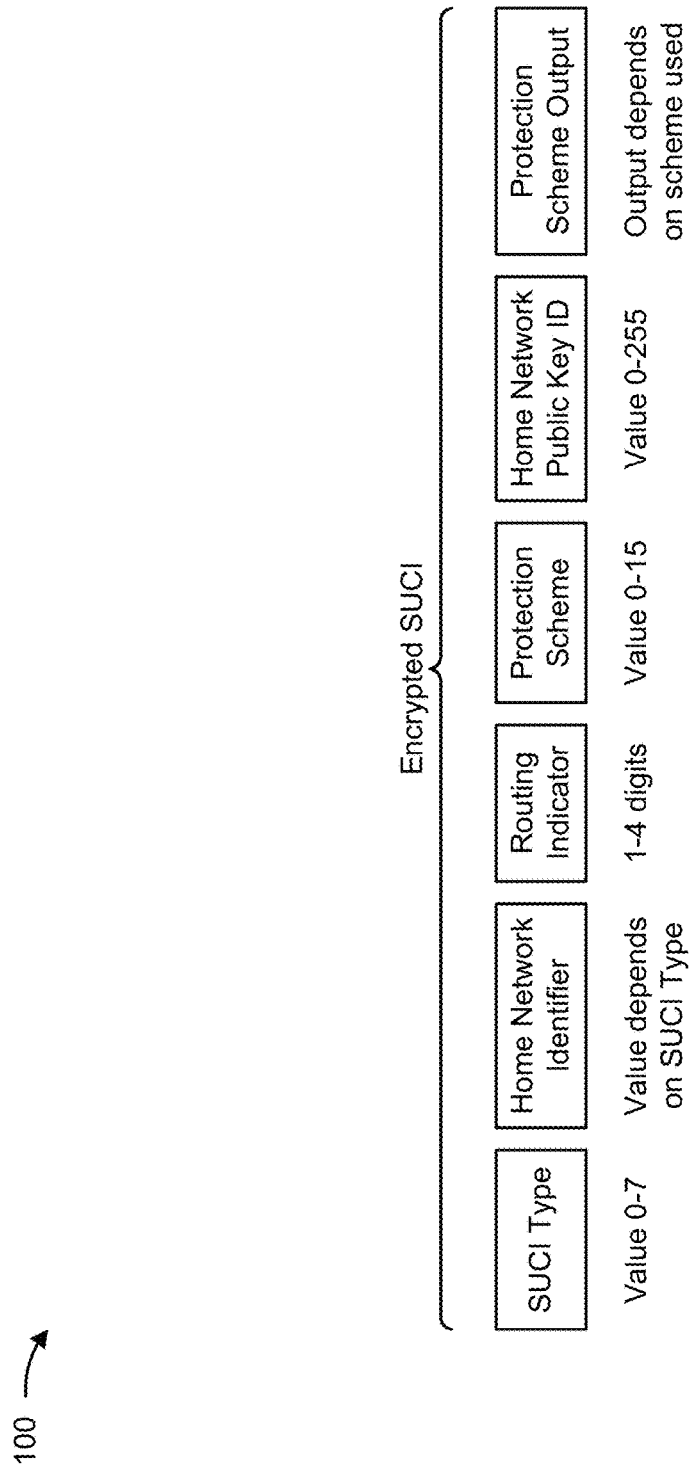

FIG. 1F depicts an example encrypted SUCI that may be utilized in implementations described herein. The encrypted SUCI may include an elliptic curve integrated encryption scheme (ECIES)-based privacy-preserving identifier that contains a concealed SUPI. As shown, the encrypted SUCI may include a SUCI type, a home network identifier, a routing indicator, a protection scheme, a home network public key identifier (ID), and a protection scheme output.

The SUCI type may include a value in a range zero (0) to seven (7). The SUCI type may identify a type of the SUPI concealed in the SUCI. For example, a value of zero (0) may indicate that the SUPI is an IMSI, a value of one (1) may indicate that the SUPI is a network access identifier (NAI), and values two (2) through seven (7) are spare values for future use.

The home network identifier may identify a home network of a subscriber (e.g., the UE 105). When the SUPI type is an IMSI, the home network identifier may include a mobile country code (MCC) and a mobile network code (MNC). When the SUPI type is an NAI, the home network identifier may include a string of characters with a variable length representing a domain name (e.g., user@website.com).

The routing indicator may include one to four decimal digits assigned by the home network operator and provisioned within the USIM of the UE 105.

The protection scheme identifier may include a value in a range of zero (0) to fifteen (15) and may be represented with four bits. For example, a protection scheme identifier of 0x0 may indicate a null scheme, a protection scheme identifier of 0x1 may indicate a first profile (e.g., profile A), a protection scheme of 0x2 may indicate a second profile (e.g., profile B), and/or the like.

The home network public key identifier may include a value in a range of zero (0) to two-hundred and fifty-five (255). The home network public key identifier may represent a public key provisioned by a home public land mobile network (HPLMN) and may identify the key used for SUPI protection. If the protection scheme is set to the null scheme, the value of the home network public key identifier may set to zero (0).

The protection scheme output may include a string of characters with a variable length or hexadecimal digits and may be dependent on the protection scheme indicated by the protection scheme identifier.

The UE 105 may generate an encrypted SUCI using an ECIES-based protection scheme with the public key of the home network that was securely provisioned to the USIM during the USIM registration. The home network public key, the protection scheme identifier, the home network public key identifier, and a SUCI calculation indication may be stored in the USIM of the UE 105.

The UE 105 may support the null scheme. If the home network has not provisioned the home network public key in the USIM of the UE 105, the SUPI protection may not be provided in an initial registration procedure. In such a case, the UE 105 may utilize the null scheme. The provisioning and updating of the home network public key, the home network public key identifier, the protection scheme identifier, and the SUCI calculation indication may be implemented using, for example, an over-the-air (OTA) mechanism. The null scheme may generate a same output as an input, which applies to both encryption and decryption. When using the null scheme, the SUCI does not conceal the SUPI and therefore newly-generated SUCIs do not need to be fresh. The newly-generated SUCIs do not need to be fresh since the lack of freshness makes linking of SUCIs together infeasible for OTA attackers.

In this way, the UDM device 120 provides network-based encryption of an identifier of the UE 105. For example, the UDM device 120 may automatically provision the home network public key, protection scheme identifier, and home network public key identifier parameters into a USIM of the UE 105 during a first registration request (e.g., when the UDM device 120 detects that the UE 105 is registering with the core network 115 via a null scheme and an unencrypted SUCI). The UDM device 120 may prevent a bad actor from deriving an identity of a user of the UE 105 and may improve user security. The UE 105 may utilize an encrypted SUCI to register with the core network 115 in the future, instead of using the unencrypted SUCI via the null scheme. The UDM device 120 may store the home network public key, the protection scheme identifier, and the home network public key identifier parameters in the UDR 125. When the UDM device 120 determines that the UE 105 is attaching to the core network 115 with an unencrypted SUCI and via the null scheme, the UDM device 120 may trigger a UPU procedure to provision the home network public key, the protection scheme identifier, and the home network public key identifier parameters in the USIM of the UE 105. Thus, the UDM device 120 may conserve computing resources, networking resources, and/or other resources associated with handling identification and tracking a user of the UE 105 by bad actors, handling interception of calls and/or messages of the UE 105 by bad actors, handling hijacking of mobile data of the UE 105 by bad actors, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
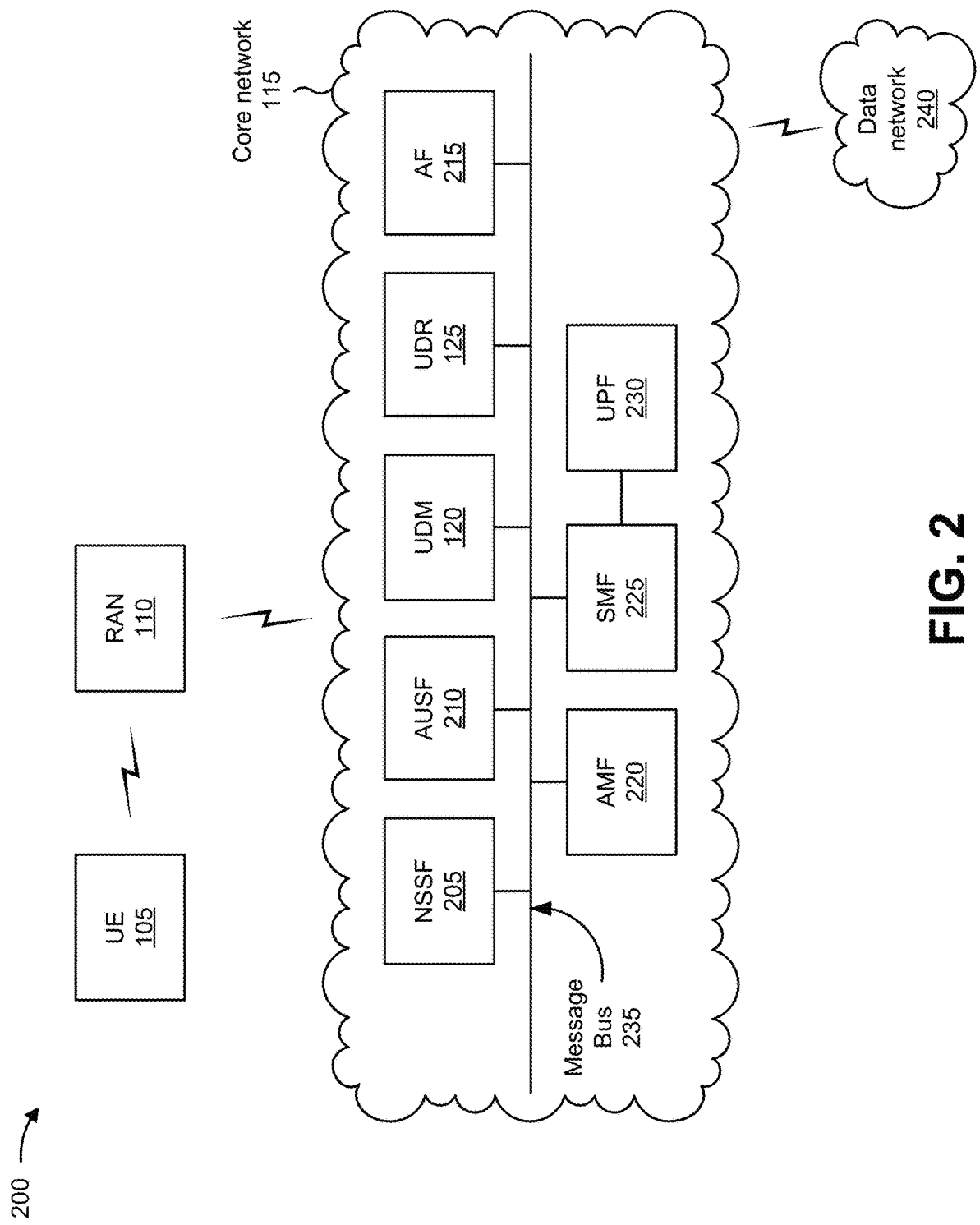
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the RAN 110, the core network 115, and a data network 240. Devices and/or networks of the example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, the UDM device 120, the UDR 125, a network slice selection function (NSSF) 205, an authentication server function (AUSF) 210, an application function (AF) 215, an access and mobility management function (AMF) 220, and/or a user plane function (UPF) 230. These functional elements may be communicatively connected via a message bus 235. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The UDM device 120 includes one or more devices that store (e.g., in the UDR 125) user data and profiles in the wireless telecommunications system. The UDM device 120 may be used for fixed access and/or mobile access in the core network 115.

The UDR 125 includes one or more devices that include a data store (e.g., a database, a table, a list, and/or the like) that stores subscription-related data associated with the wireless telecommunications system. The UDR 125 may store data grouped into distinct collections of subscription-related information, such as, for example, subscription data, policy data, structured data for exposure, application data, and/or the like.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The AUSF 210 includes one or more devices that act as an authentication server and support the process of authenticating the UE 105 in the wireless telecommunications system.

The AF 215 includes one or more devices that support application influence on traffic routing, access to other functions, and/or policy control, among other examples.

The AMF 220 includes one or more devices that act as a termination point for non-access stratum (NAS) signaling and/or mobility management, among other examples.

The SMF 225 includes one or more devices that support the establishment, modification, and release of communication sessions in the wireless telecommunications system. For example, the SMF 225 may configure traffic steering policies at the UPF 230 and/or may enforce user equipment Internet protocol (IP) address allocation and policies, among other examples.

The UPF 230 includes one or more devices that serve as an anchor point for intraRAT and/or interRAT mobility. The UPF 230 may apply rules to packets, such as rules pertaining to packet routing, traffic reporting, and/or handling user plane QoS, among other examples.

The message bus 235 represents a communication structure for communication among the functional elements. In other words, the message bus 235 may permit communication between two or more functional elements.

The data network 240 includes one or more wired and/or wireless data networks. For example, the data network 240 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
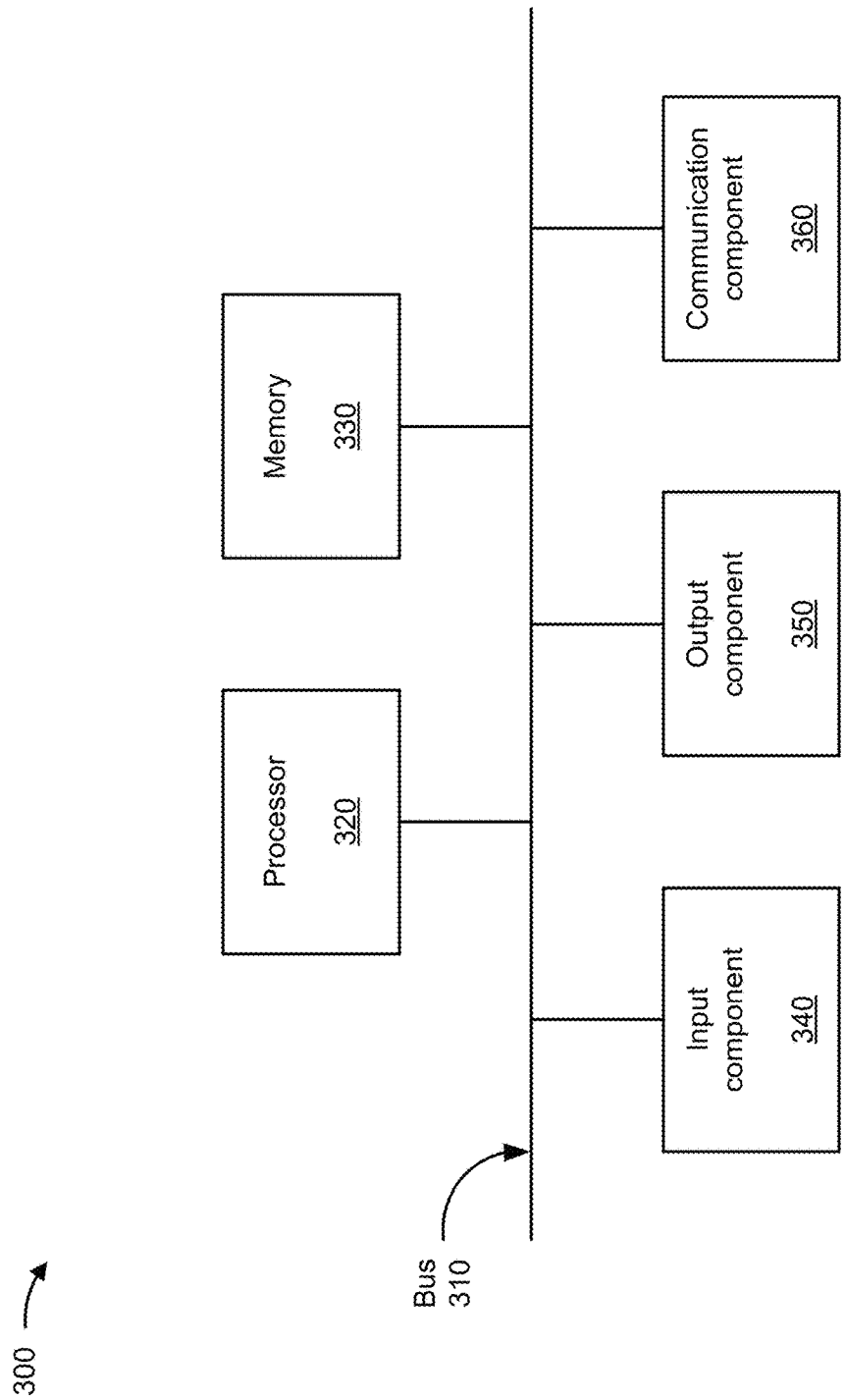
FIG. 3 is a diagram of example components of one or more devices of FIG. 2.

FIG. 3 is a diagram of example components of a device 300, which may correspond to the UE 105, the RAN 110, the UDM device 120, the UDR 125, the NSSF 205, the AUSF 210, the AF 215, the AMF 220, the SMF 225, and/or the UPF 230. In some implementations, the UE 105, the RAN 110, the UDM device 120, the UDR 125, the NSSF 205, the AUSF 210, the AF 215, the AMF 220, the SMF 225, and/or the UPF 230 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RANI), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for network-based encryption of a UE identifier. In some implementations, one or more process blocks of FIG. 4 may be performed by a network device (e.g., the UDM device 120). In some implementations, one or more process blocks of FIG. 4 may be performed by another device or a group of devices separate from or including the network device, such as a UDR (e.g., the UDR 125), an AMD (e.g., the AMF 220), and/or an AUSF (e.g., the AUSF 210). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a request for authentication data for a UE attempting to register with a network (block 410). For example, the network device may receive a request for authentication data, for a UE attempting to register with a network, and an indication that a SUCI utilized by the UE is unencrypted, as described above.

As further shown in FIG. 4, process 400 may include requesting the authentication data from a data store (block 420). For example, the network device may request, from a data store, the authentication data for the UE based on the request for the authentication data, as described above. In some implementations, the data store is provided by a unified data repository associated with the network device. In some implementations, the data store stores one or more of a home network identifier for the UE, a protection scheme for the UE, or a home network public key identifier for the UE. In some implementations, the home network identifier identifies a home network for the UE, the protection scheme identifies a null scheme or a profile scheme for the UE, and the home network public key identifier identifies a public key to be used to encrypt the encrypted SUCI.

As further shown in FIG. 4, process 400 may include providing, to the data store, a notification instructing the data store to push a UPU once a registration process is complete (block 430). For example, the network device may provide, to the data store and based on the indication, a notification instructing the data store to push a UPU once a registration process is complete for the UE, as described above. In some implementations, the UPU includes one or more of a home network identifier for the UE, a protection scheme for the UE, or a home network public key identifier for the UE.

As further shown in FIG. 4, process 400 may include receiving the authentication data from the data store (block 440). For example, the network device may receive the authentication data from the data store based on requesting the authentication data from the data store, as described above.

As further shown in FIG. 4, process 400 may include completing the registration process for the UE (block 450). For example, the network device may complete the registration process for the UE based on the authentication data, as described above. In some implementations, completing the registration process for the UE based on the authentication data includes providing the authentication data to one or more other network devices configured to cause the registration process for the UE to be completed. In some implementations, completing the registration process for the UE based on the authentication data includes receiving, from another network device, a request for access and mobility subscription data for the UE; requesting the access and mobility subscription data from the data store based on the request for the access and mobility subscription data; receiving the access and mobility subscription data from the data store based on requesting the access and mobility subscription data from the data store; and providing the access and mobility subscription data to the other network device.

As further shown in FIG. 4, process 400 may include receiving the UPU from the data store based on the registration process being completed (block 460). For example, the network device may receive, based on the notification, the UPU from the data store based on the registration process being completed, as described above.

As further shown in FIG. 4, process 400 may include causing the UE to detach from the network after utilizing the UPU (block 470). For example, the network device may cause the UE to detach from the network after utilizing the UPU, as described above. In some implementations, the UE is configured to utilize the UPU to update a USIM of the UE so that the UE generates the encrypted SUCI.

As further shown in FIG. 4, process 400 may include causing the UE to connect to the network based on a registration request (block 480). For example, the network device may cause the UE to connect to the network based on a registration request generated by the UE and including an encrypted SUCI, as described above. In some implementations, the encrypted SUCI includes data identifying one or more of a SUCI type, a home network identifier for the UE, a routing indicator for the UE, a protection scheme for the UE, a home network public key identifier for the UE, or a protection scheme output for the UE. In some implementations, the SUCI type includes an IMSI for the UE or a network access identifier for the UE. In some implementations, the encrypted SUCI includes a concealed SUPI associated with the UE.

In some implementations, process 400 includes receiving, from the UE, an acknowledgment that the UPU updated a USIM of the UE, and instructing, based on the acknowledgment, the data store to prevent future UPUs for the UE.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device, a request for authentication data, for a user equipment (UE) attempting to register with a network, and an indication that a subscription concealed identifier (SUCI) utilized by the UE is unencrypted;
   requesting, by the network device and from a data store, the authentication data for the UE based on the request for the authentication data,
      wherein the data store is provided by a unified data repository associated with the network device;
   providing, by the network device, to the data store, and based on the indication, a notification instructing the data store to push a UE parameters update (UPU) once a registration process is complete for the UE;
   receiving, by the network device, the authentication data from the data store based on requesting the authentication data from the data store;
   completing, by the network device, the registration process for the UE based on the authentication data;
   receiving, by the network device and based on the notification, the UPU from the data store based on the registration process being completed;
   causing, by the network device, the UE to detach from the network after utilizing the UPU; and
   causing, by the network device, the UE to connect to the network based on a registration request generated by the UE and including an encrypted SUCI.

2. The method of claim 1, wherein the UPU includes one or more of:
   a home network identifier for the UE,
   a protection scheme for the UE, or
   a home network public key identifier for the UE.

3. The method of claim 1, further comprising:
   receiving, from the UE, an acknowledgment that the UPU updated a universal subscriber identity module of the UE; and
   instructing, based on the acknowledgment, the data store to prevent future UPUs for the UE.

4. The method of claim 1, wherein completing the registration process for the UE based on the authentication data comprises:
   providing the authentication data to one or more other network devices configured to cause the registration process for the UE to be completed.

5. The method of claim 1, wherein the UE is configured to utilize the UPU to update a universal subscriber identity module of the UE so that the UE generates the encrypted SUCI.

6. The method of claim 1, wherein the encrypted SUCI includes data identifying one or more of:
- a SUCI type,
- a home network identifier for the UE,
- a routing indicator for the UE,
- a protection scheme for the UE,
- a home network public key identifier for the UE, or
- a protection scheme output for the UE.

7. The method of claim 6, wherein the SUCI type includes an international mobile subscriber identity for the UE or a network access identifier for the UE.

8. A network device, comprising:
one or more processors configured to:
- receive a request for authentication data, for a user equipment (UE) attempting to register with a network, and an indication that a subscription concealed identifier (SUCI) utilized by the UE is unencrypted;
- request, from a data store, the authentication data for the UE based on the request for the authentication data;
- provide to the data store, and based on the indication, a notification instructing the data store to push a UE parameters update (UPU) once a registration process is complete for the UE;
- receive the authentication data from the data store based on requesting the authentication data from the data store;
- complete the registration process for the UE based on the authentication data;
- receive, based on the notification, the UPU from the data store based on the registration process being completed;
- cause the UE to detach from the network after utilizing the UPU;
- receive, from the UE, an acknowledgment that the UPU updated a universal subscriber identity module of the UE;
- instruct, based on the acknowledgment, the data store to prevent future UPUs for the UE; and
- cause the UE to connect to the network based on a registration request generated by the UE and including an encrypted SUCI.

9. The network device of claim 8, wherein the data store stores one or more of:
- a home network identifier for the UE,
- a protection scheme for the UE, or
- a home network public key identifier for the UE.

10. The network device of claim 8, wherein the UPU includes one or more of:
- a home network identifier for the UE,
- a protection scheme for the UE, or
- a home network public key identifier for the UE.

11. The network device of claim 10, wherein:
- the home network identifier identifies a home network for the UE,
- the protection scheme identifies a null scheme or a profile scheme for the UE, and
- the home network public key identifier identifies a public key to be used to encrypt the encrypted SUCI.

12. The network device of claim 8, wherein the network device is a unified data management device.

13. The network device of claim 8, wherein the one or more processors, to complete the registration process for the UE based on the authentication data, are configured to:
- receive, from another network device, a request for access and mobility subscription data for the UE;
- request the access and mobility subscription data from the data store based on the request for the access and mobility subscription data;
- receive the access and mobility subscription data from the data store based on requesting the access and mobility subscription data from the data store; and
- provide the access and mobility subscription data to the other network device.

14. The network device of claim 8, wherein the encrypted SUCI includes a concealed subscription permanent identifier associated with the UE.

15. A non-transitory computer-readable medium storing a set of instructions, the set of instructions comprising:
one or more instructions that, when executed by one or more processors of a network device, cause the network device to:
- receive a request for authentication data, for a user equipment (UE) attempting to register with a network, and an indication that a subscription concealed identifier (SUCI) utilized by the UE is unencrypted;
- request, from a data store, the authentication data for the UE based on the request for the authentication data;
- provide to the data store, and based on the indication, a notification instructing the data store to push a UE parameters update (UPU) once a registration process is complete for the UE;
- receive the authentication data from the data store based on requesting the authentication data from the data store;
- complete the registration process for the UE based on the authentication data;
- receive, based on the notification, the UPU from the data store based on the registration process being completed;
- cause the UE to detach from the network after utilizing the UPU; and
- cause the UE to connect to the network based on a registration request generated by the UE and including an encrypted SUCI that includes a concealed subscription permanent identifier associated with the UE.

16. The non-transitory computer-readable medium of claim 15, wherein the one or more instructions further cause the network device to:
- receive, from the UE, an acknowledgment that the UPU updated a universal subscriber identity module of the UE; and
- instruct, based on the acknowledgment, the data store to prevent future UPUs for the UE.

17. The non-transitory computer-readable medium of claim 15, wherein the one or more instructions, that cause the network device to complete the registration process for the UE based on the authentication data, cause the network device to:
- provide the authentication data to one or more other network devices configured to cause the registration process for the UE to be completed.

18. The non-transitory computer-readable medium of claim 15, wherein the network device is configured to utilize the UPU to update a universal subscriber identity module of the UE so that the UE generates the encrypted SUCI.

19. The non-transitory computer-readable medium of claim 15, wherein the encrypted SUCI includes data identifying one or more of:
 a SUCI type,
 a home network identifier for the UE,
 a routing indicator for the UE,
 a protection scheme for the UE,
 a home network public key identifier for the UE, or
 a protection scheme output for the UE.

20. The non-transitory computer-readable medium of claim 15, wherein the one or more instructions, that cause the network device to complete the registration process for the UE based on the authentication data, cause the network device to:
 receive, from another network device, a request for access and mobility subscription data for the UE;
 request the access and mobility subscription data from the data store based on the request for the access and mobility subscription data;
 receive the access and mobility subscription data from the data store based on requesting the access and mobility subscription data from the data store; and
 provide the access and mobility subscription data to the other network device.

\* \* \* \* \*